United States Patent [19]
Trischan et al.

[11] Patent Number: 5,141,110
[45] Date of Patent: Aug. 25, 1992

[54] METHOD FOR SORTING PLASTIC ARTICLES

[75] Inventors: Glenn M. Trischan, Brown Deer; Louis Cartz, Milwaukee, both of Wis.

[73] Assignee: Hoover Universal, Inc., Ann Arbor, Mich.

[21] Appl. No.: 477,606

[22] Filed: Feb. 9, 1990

[51] Int. Cl.⁵ .............................................. B07C 5/34
[52] U.S. Cl. .................................. 209/524; 209/579; 209/587; 209/588; 209/589; 209/702; 209/942; 209/3.001; 356/240; 250/225; 250/223 B
[58] Field of Search ............... 209/522, 524, 523, 576, 209/577, 588, 657, 589, 579, 702, 942, 3.1, 587; 356/365, 240, 239; 250/223 B, 225; 241/99

[56] References Cited

U.S. PATENT DOCUMENTS

| | | | |
|---|---|---|---|
| 2,441,049 | 5/1948 | West | 356/365 X |
| 3,197,647 | 7/1965 | Fraenkel | 250/225 |
| 3,313,941 | 4/1967 | Marks | 250/219 |
| 3,355,980 | 12/1967 | Mathias | 88/14 |
| 3,963,348 | 6/1976 | Nakatani et al. | 356/33 |
| 4,136,779 | 1/1979 | Bierenger | 209/524 |
| 4,262,806 | 4/1981 | Drabs | 209/577 |
| 4,417,662 | 11/1983 | Nicholson et al. | 209/522 |
| 4,617,111 | 10/1986 | Grimm et al. | 209/4 |
| 4,659,112 | 4/1987 | Reiner et al. | 283/90 |
| 4,905,169 | 2/1990 | Buican et al. | 356/365 X |
| 4,908,507 | 3/1990 | Imre et al. | 250/223 B |
| 4,915,237 | 4/1990 | Chang et al. | 209/524 |
| 4,919,534 | 4/1990 | Reed | 356/407 X |
| 4,973,163 | 11/1990 | Sakai et al. | 250/225 X |
| 4,984,875 | 1/1991 | Abe et al. | 356/365 X |

FOREIGN PATENT DOCUMENTS

| | | | |
|---|---|---|---|
| 291959 | 11/1988 | European Pat. Off. | |
| 63-243836 | 10/1988 | Japan . | |
| 1141315 | 2/1985 | U.S.S.R. | 356/365 |
| 2135769 | 9/1984 | United Kingdom | 250/223 B |

Primary Examiner—Donald T. Hajec
Attorney, Agent, or Firm—Foley & Lardner

[57] ABSTRACT

A method of sorting a mixed group of plastic articles, such as PET and PVC containers, involves individually subjecting each article to a beam of electromagnetic radiation, and detecting a change in the intensity of the beam. The measured intensity varies in a manner indicative of the crystallinity of the plastic from which the article is made, and hence identifies the type of plastic the article is made of. Each article is then sent to one of a plurality of destinations, such as recycling collection bins, according to the type of plastic. The method is particularly useful in separating PET and PVC used in containers, since these plastics are very difficult to sort by conventional methods.

24 Claims, 11 Drawing Sheets

METHOD FOR SORTING PLASTIC ARTICLES

TECHNICAL FIELD

This invention relates to a method for reliably sorting articles made of plastic materials, particularly PET and PVC plastics, which are closely similar in density and appearance. The invention further pertains to apparatus for performing such a method.

BACKGROUND OF THE INVENTION

Bottles made of polyvinyl chloride (PVC) and polyethylene terephthalate (PET) are in widespread use as containers for beverages such as soda. Collections of such plastic containers for recycling generally include clear colorless bottles of both PET and PVC. Clear colorless reclaimed PET is substantially more valuable for reprocessing when free of PVC. However, the similarity in density (1.34 g/cc for PET, 1.32 g/cc for PVC) precludes separation of the two materials on the basis of simple density devices most common in recycling systems.

Alternative separation methods have been proposed which employ density alteration by solvent soaking or X-ray attenuation. See Grimm et al., U.S. Pat. No. 4,617,111, issued Oct. 14, 1986, and European Patent Publication No. 291,959, published Nov. 23, 1988, respectively. The X-ray attenuation method examines whole bottles or large segments before grinding. PET does not attenuate X-rays by absorption significantly, whereas PVC produces substantial attenuation. The intensity contrast between PET and PVC is used for sorting purposes. However, the X-ray technique requires use of ionizing radiation with its inherent hazards, and requires that the X-ray radiation penetrate through the plastic article.

The solvent soaking technique is performed on ground bottles and requires the use of one or more organic solvents. PET density is not affected during solvent exposure. By contrast, upon prolonged solvent exposure, the density of PVC approaches the solvent density. This provides a sufficient density difference to allow sorting with traditional density sorting devices. However, the use of organic solvents creates safety and disposal problems and is thus undesirable. Residual solvent must be removed from the treated PET before further processing.

Polarized light has been used in a variety of sorting and detection systems, for example, an identification system for ID cards (Reiner et al. U.S. Pat. No. 4,659,112, issued Apr. 21, 1987), a system for sorting translucent objects such as colored rice grains (Fraenkel U.S. Pat. No. 3,197,647, issued Jul. 27, 1965), a system using polarized infrared light to sort foreign objects from vegetables (Drabs U.S. Pat. No. 4,262,806, issued Apr. 21, 1981, a system for identifying invisible written characters (Marks U.S. Pat. No. 3,313,941, issued Apr. 11, 1967), a system for inspecting glass containers, vials and bottle rims (see Mathias U.S. Pat. No. 3,355,980 issued Dec. 5, 1967, Nicholson et al. U.S. Pat. No. 4,417,662, issued Nov. 19, 1983 and Nakatani et al. U.S. Pat. No. 3,963,348, issued Jun. 15, 1976), and a system for measuring the surface orientation of polymeric materials (Japanese Patent Publication No. 63-243836, Oct. 11, 1988). None of these patents provide a system for sorting plastic articles such as PET and PVC containers which have different degrees of crystallinity. The present invention addresses the various disadvantages of prior methods for sorting plastic articles.

SUMMARY OF THE INVENTION

The invention provides a method of sorting a mixed group of plastic articles, which group contains at least two types of articles made of different types of plastic and having a crystallinity indicative of each type of plastic. Each plastic article in the group is individually subjected to a beam of electromagnetic radiation, and any change in the intensity of the beam is thereafter detected. The measured intensity varies in a manner indicative of the crystallinity of the plastic from which the article is made, and hence identifies the type of plastic the article is made of. Each article is then sent to one of a plurality of destinations according to the type of plastic, such as recycling collection bins.

The crystallinity of a plastic directly affects its birefringence, i.e., its ability to shift (rotate) the plane of polarized light. Birefringence is the difference between the refractive indices of a solid, and occurs in anisotropic crystalline materials. The refractive indices vary with the direction of transmission of light through the crystalline body. In general, a light beam traversing the crystalline body is split into two perpendicularly polarized beams which travel through the solid at different velocities and which interfere with one another on emerging from the crystalline body. This interference can result in the rotation of the plane of polarization of the light beam, so that examination of the crystalline body between crossed-polarizers results in light being transmitted by the second polarizer (analyzer).

The method of the invention can be carried out by determining the birefringence of each of a series of plastic articles, and sorting the articles into two or more groups of varying birefringence. Birefringence can be measured in several ways, for example, by careful observation of the optic interference figure produced by the interfering light beams, or by measuring the individual refractive using a refractometer.

In a third technique for determining birefringence, a plastic article such as a PET container having a high level of anisotropic crystallinity and birefringence is inserted between a pair of polarizing filters positioned for extinction. A beam of light passing successively through the first polarizing filter, the PET article, and the second polarizing filter oriented perpendicular to the first polarizer will produce a bright image of the article when viewed through the second polarizing filter. This happens because the plane of polarization of the light passing through the article is rotated and thus can pass through the second perpendicular polarizing filter to a far greater extent than light passing directly from the first filter to the second. For purposes of this embodiment, the plastic article must be substantially transparent.

When the procedure is repeated for an article of low birefringence, such as a PVC container, no appreciable image is formed; the view through the second polarizing filter remains dark. This difference in relative contrast can be used to sort the articles manually or automatically. An apparatus for carrying out the preceding method of the invention includes two polarizing filters positioned for total light extinction, a light source disposed to send light through the polarizing filters, a detector responsive to the amount of light which passes through both polarizing filters, a conveyor system for passing the plastic articles singly between the filters, suitable means such as a gate or diverter for routing articles from the conveyor to different collection zones, and associated electronics or mechanics for controlling the diverter in accordance with signals from the detector.

According to further aspects of the invention, the crystallinity of the plastic article may be measured by other forms of incident electromagnetic radiation. For example, Bragg scattering of X-radiation will vary depending on the crystallinity of the plastic, and the resulting difference in intensity of diffracted radiation can be used to sort a collection of plastic articles made of different plastics by either reflection or transmission of the incident X-rays. This approach is distinctly different from the process described in the foregoing European patent publication, which relies on absorption of the radiation, not differences in crystallinity. Reflection-based X-ray diffraction simplifies handling problems in an automated sorting system according to the invention. Opaque plastics, as well as transparent and translucent plastics, can be inspected by this method.

BRIEF DESCRIPTION OF THE DRAWING

The invention will be further described with reference to the accompanying drawing, wherein like numerals denote like elements, and.

DETAILED DESCRIPTION

Figures 1, 2, 3, 5:
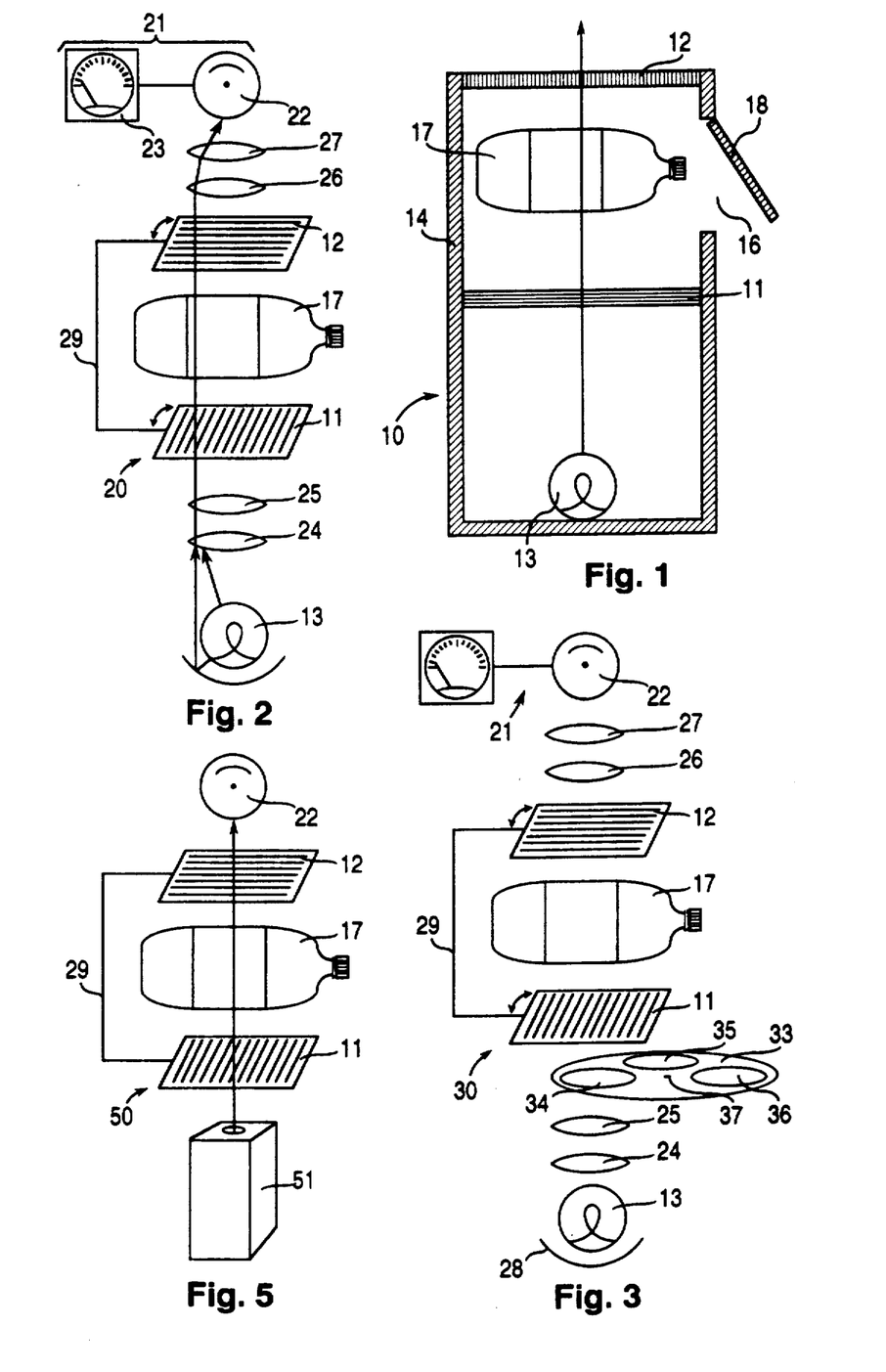
FIG. 1 is a lengthwise sectional view of an apparatus according to the invention for manual sorting of plastic articles.
FIG. 2 is a schematic diagram of a further apparatus according to the invention for sorting plastic articles.
FIG. 3 is an alternative embodiment of the apparatus shown in FIG. 2, including means for discriminating among colored plastic articles.
FIG. 5 is an alternative embodiment of the apparatus shown in FIG. 2 including a laser light source.

Referring to FIG. 1, an apparatus 10 according to the invention for use in manual sorting of plastic articles includes a pair of first and second polarization filters 11, 12, and a polychromatic light source 13 mounted inside an enclosure, such as a box 14. Box 14 is generally rectangular and has opaque walls. Polarizing filters 11, 12 are mounted in parallel, spaced positions on the inside of box 14, with second polarizing filter 12 (the analyzer) oriented with its plane of polarization at 90° to that of first polarizing filter 11 (the polarizer). Such an arrangement is known as crossed polarizers. Second filter 12 can conveniently form one end wall of the enclosure. Box 14 has an opening 16 in one side wall thereof through which a plastic article 17, such as a PET or PVC container, may be inserted between filters 11, 12. Opening 16 may be covered by a flap 18 to prevent stray light from entering into box 14 during observation of container 17.

The light source 13, such as an incandescent or fluorescent light, is mounted within box 14 behind first polarizing filter 11 so that light therefrom shines through polarizing filter 11 and illuminates container 17. Light source 13 is connected to a suitable power supply when apparatus 10 is in use. Filters 11, 12 are positioned for total extinction of light from source 13, i.e., polarizing filter 12 is disposed at an angle, generally 90 degrees, relative to polarizing filter 11, so that filter 12 blocks transmission of light from source 13. As a result, little or no light from source 13 can be seen by an observer viewing apparatus 10 through filter 12.

When container 17 is made of a plastic having high birefringence, such as PET, the plane of polarization of light passing through container 17 will be rotated relative to its original direction. As a result, the second polarizing filter 12 does not attenuate such light as effectively as unrotated light. The observer accordingly sees a bright image of container 17. When a container made of a plastic of low birefringence, such as PVC, is placed between crossed polarizing filters 11, 12, the light from source 13 passes through the container without the plane of polarization being rotated substantially. The resulting image, if any, is dark in comparison to the PET image. The effect is remarkable because, as to 2 liter PET and PVC bottles presently in widespread use, the bottles are otherwise indistinguishable, in other words, are both transparent and have the same shape and density.

The simple apparatus of FIG. 1 can be readily used by anyone to distinguish different types of plastic articles, particularly transparent plastic containers such as PET and PVC beverage bottles, wherein the transmission of light between crossed polarizers identifies the plastic type. In accordance with the method of the invention, a user such as a person returning bottles to a local recycling center inserts each bottle into the apparatus and observes the result. He or she can then place the bottle into one of several available receptacles each marked "bright image" for PET and "dark image" for PVC and other types of plastic having low light transmission.

Birefringent materials have different indices of refraction in two or more different directions. An incident beam of light can thus be split (refracted) into two separate rays which travel in different directions. In the case of incident polarized light traversing the birefringent object, the effect in general is to rotate the plane of polarization of the light beam. The resulting rotation partially counteracts the effect of the second polarization filter, resulting in the transmission of a bright image. The brightness of the image will vary in a predictable manner depending on the birefringence of the material. The following table sets forth birefringence values of various common plastics:

| BIREFRINGENCE VALUES FOR SELECTED POLYMERS | |
|---|---|
| Material | Birefringence |
| Acetate | +0.005 |
| Acrylic (Delustered) | −0.005 |
| Acrylic (Orlon) | −0.002 |
| Rayon | +0.021 to +0.045 |
| Dynel (PVC/Acrylonitrile) | +0.002 |
| Teklan (Modacrylic) | −0.004 |
| Olefin (Polypropylene) | +0.034 |
| High Density Polyethylene | +0.040 |
| Kynol (Undrawn) | +0.001 |
| (Drawn) | +0.022 |
| Polyamide (Nomex) | +0.036 |
| Polyamide (Nylon) | +0.060 |
| (Undrawn Nylon) | +0.025 |
| Polyester (Dacron, PET, Mylar) | +0.175 |
| Triacetate | +0.001 |
| Viscose Rayon | +0.020 |

A rating of zero indicates the material is isotropic (non-birefringent), in other words, has a uniform refractive index in all directions.

The foregoing method of the invention employing polarized light can be modified to include a measuring device to measure quantitatively the amount of light transmitted. In this manner plastics closer in birefringence than PET and PVC can also be sorted. Plastics having birefringence which differ by about 0.002 or less are very difficult to distinguish visually using the basic apparatus of FIG. 1.

FIG. 2 illustrates an apparatus 20 according to the invention including a light meter 21. Light meter 21 includes a detector 22 positioned on the side of the second polarization filter 12 opposite first filter 11 and light source 13, and a display device 23 for providing a measurement to the user of the intensity of light transmitted through filter 12. Detector 22 is any of a variety of devices which receive light and convert it to a signal, e.g., an electrical current, such as a phototransistor, photodiode, phototube, or a photomultiplier. Display device 23 displays the magnitude of the measured light intensity as a digital or analog signal, and may comprise a conventional meter, LED, LCD, or the like.

One or more collimating lenses 24, 25 may be provided between light source 13 and filter 11, and a second set of collimating lenses 26, 27 may be provided between filter 12 and detector 22 to render illumination of article 17 more uniform. Such collimating optics facilitates observation of whole objects or small sections of each object. The dotted line in FIG. 2 illustrates how lenses 24-27 can be used to examine a specific area of article 17 and focus the resulting transmitted light on detector 22. When light source 13 is an incandescent bulb as shown, a parabolic reflector 28 can be disposed behind light source 13 to intensify the light directed through article 17.

Crossed polarizers 11, 12 which are arranged for maximum extinction can be disposed by means of a suitable mechanical linkage 29 for simultaneous axial rotation in a plane substantially perpendicular to the lengthwise axis of apparatus 20, i.e., the imaginary line between source 13 and detector 22. Filters 11, 12 remain substantially parallel to each other. Such rotation of up to 90 degrees allows the user to adjust the filters for maximum contrast (depolarization) depending on the shape of article 17.

Referring now to FIG. 3, an alternative embodiment 30 of the apparatus shown in FIG. 2 includes a filter wheel 33 disposed between light source 13 and polarization filter 11. Filter wheel 33 has a plurality of differently colored windows 34, 35, 36 preferably of the same size as lenses 24, 25. Windows 34-36 are made of a colored glass or plastic material. Wheel 33 is disposed for rotation about its center 37 by suitable means (not shown) so that rotation of wheel 33 brings each of windows 34-36 successively into alignment with the lengthwise axis of apparatus 30.

It is desirable to separate colored PET bottles from colorless PET bottles for recycling purposes. Since monochromatic light is subject to the effects of birefringence in the same manner as polychromatic light, illumination of a clear bottle with red light (about 675 nm) can be used to identify and sort colorless PET, green PET, and PVC containers. Examination of each article is first carried out with polychromatic (e.g., white) light to distinguish PVC from PET and then with the red light to distinguish colorless PET from green PET. PVC will not transmit a significant amount of light of either color of light. Colorless PET will transmit a significant amount of both colors of light. Green PET will provide significant transmission when illuminated with polychromatic plane polarized light but will attenuate the intensity of the red plane polarized light. In this manner colorless PET, green PET and PVC articles may be sorted into three groups.

Additional colored filters 34, 35 in filter wheel 33 allow for differentiation of other colored materials. For example, brown containers can be sorted from colorless PET and other colors of PET by illuminating each article with about 450 nm wavelength light. Alternately, a narrow response detector (spectrometer, photomultiplier tube, or cut-off filters) can be used to distinguish different intensity threshholds at specific wavelengths associated with different colors of PET and lack of intensity from PVC when examined between polarizing filters set for extinction.

Figure 4A:
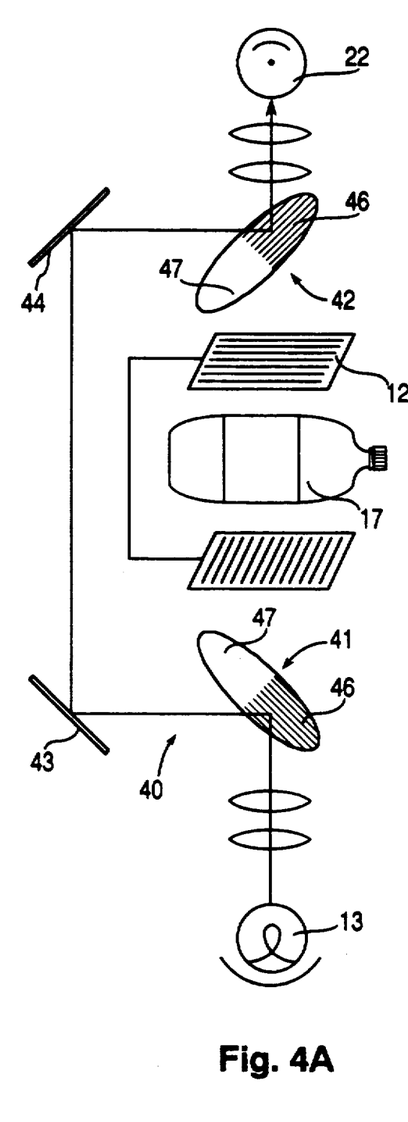
FIGS. 4A and 4B show alternative embodiments of the apparatus shown in FIG. 2, including means for compensating for variations in the intensity of the light source.
Figure 4B:
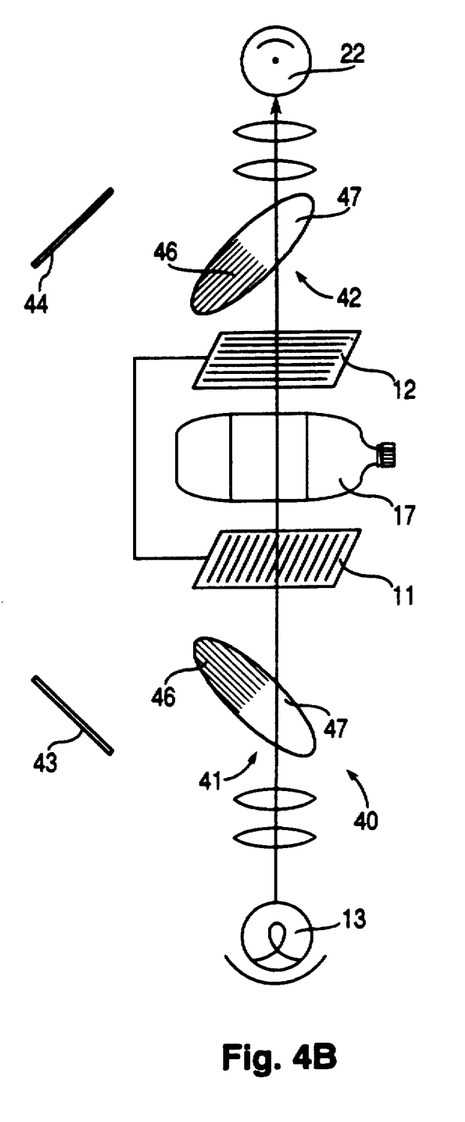

FIGS. 4A and 4B illustrate an apparatus 40 according to the invention similar to the embodiment of FIG. 2, but including components allowing for variations in the intensity of light source 13 to be accounted for. While such variations might not be substantial enough to affect the system's ability to distinguish between PET and PVC, such might not be true as between other types of plastics having closer birefringence ratios. A pair of light choppers (splitters) 41, 42 are disposed on opposite sides of filters 11, 12, and a pair of angled mirrors 43, 44 are aligned with choppers 41, 42 respectively to one side thereof. A face of each chopper 41, 42 includes a mirrored half 46 and a transparent half 47. As shown in FIG. 4A, when choppers 41, 42 are rotated so that mirrored portions 46 are interposed directly between source 13 and detector 22 and each chopper 41, 42 is parallel to its respective mirror 43, 44, light from source 13 is diverted around filters 11, 12 entirely and reaches detector 22 undiminished. This provides a control reading for the current intensity of source 13.

As shown in FIG. 4B, when choppers 41, 42 are rotated so that transparent portions 47 are interposed directly between source 13 and detector 22, the apparatus works in the same manner as described in connection with FIG. 2. Each article 17 is inspected in this manner, and comparative measurements are made continuously, e.g., by synchronized spinning of choppers 41, 42. A lock-in amplifier and comparator circuitry can be connected to detector 22 to provide automatic compensation for drift in the intensity of light source 13. This is a standard optical system used in double beam spectrophotometer applications to compensate for variations in source intensity.

FIG. 5 illustrates a further apparatus 50 according to the invention wherein incandescent light source 13 is replaced by a monochromatic laser 51. Laser 51 minimizes scatter depolarization of incident light due to irregularities in article 17 or the shape of article 17, and eliminates the need for collimating lenses. In practice, laser light has provided a clearer difference in brightness between PET, PVC, and other plastics. A series of colored lasers could be used for color sorting as described above.

Figure 6A:
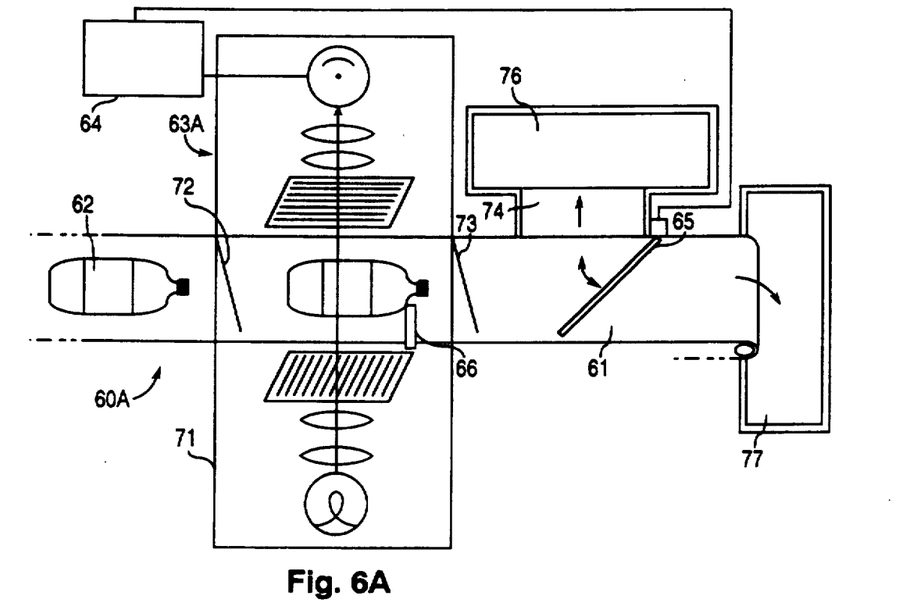
FIGS. 6A and 6B are schematic diagrams of two forms of automated sorting apparatus according to the invention.
Figure 6B:
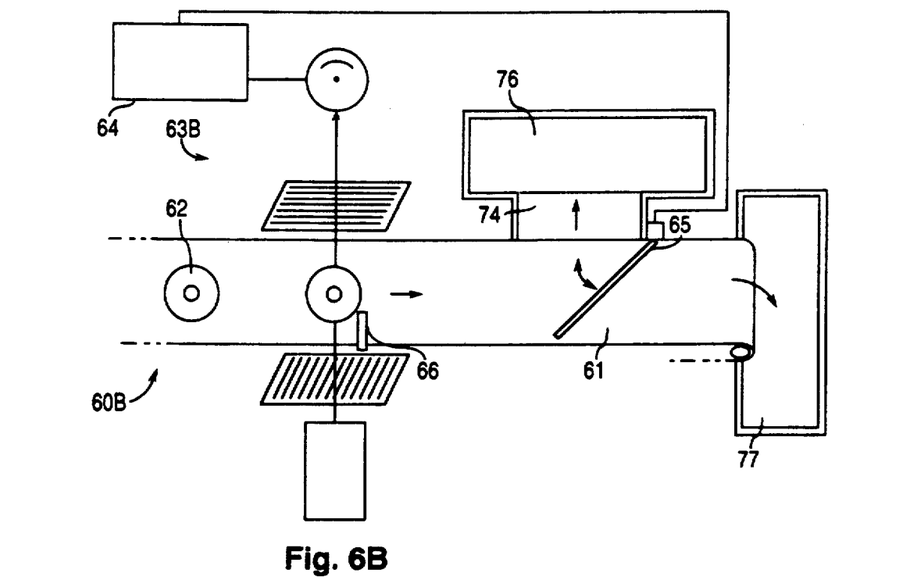

FIGS. 6A and 6B show two simple forms of automated sorting apparatus according to the invention. In FIG. 6A, an apparatus 60A includes a conveyor 61 which transports a series of plastic containers 62 through a detector unit 63A, which has components generally illustrated in FIG. 2 (or FIGS. 3, 4A or 4B or 5). Detector 63A includes a housing 71 having entrance and exits covers 72, 73 for preventing stray light from entering detector 63A and causing a false PET (positive) reading.

Detector 63A is connected to a controller 64 which actuates a gate 65. A position switch 66 or the equivalent (e.g., a sensor) disposed within detector 63A (or elsewhere along conveyor 61) is tripped by each successive container 62. Switch 66 is connected to the drive unit of conveyor 61 so that conveyor 61 stops upon entry of each container 62 into detector housing 71. Detector 63A then obtains a transmitted light intensity reading for the container 62. If the reading is negative (a dark image corresponding to PVC), controller 64 operates to extend gate 65 as shown. Conveyor 61 then restarts, carrying container 62 out of detector 63A and into contact with gate 65. Gate 65 diverts the PVC container into an inclined chute (or secondary conveyor) 74 which conducts the container to a PVC storage bin 76.

The next container 62 then moves into contact with switch 66, gate 65 returns to its retracted position, and the cycle is repeated. If the next container 62 is a PET container, gate 65 remains retracted, and the container continues to travel along conveyor 61 until it falls into a PET bin 77. In this manner an initial mixture of PET and PVC containers can be sorted to form two separate collections of PET and PVC containers. Containers 62 are preferably cleaned and delabeled prior to inspection by detector 62.

Suitable means, such as a series of recesses or partitions, may be provided on conveyor 61 to ensure that containers 62 are spaced at uniform intervals along conveyor 61. This is important insofar as PVC containers must travel far enough along conveyor 61 to fall into chute 74 before the next container trips switch 66.

FIG. 6B illustrates an alternative apparatus 60B wherein containers 62 are presented in an upright position on conveyor 61. Detector 63B utilizes a laser light source (FIG. 5) and thus no housing 71 is required. The laser can be positioned to examine each container in the region above the label but below the narrow neck of the container. This can eliminate the need for delabeling the containers prior to sorting.

Figure 7A:
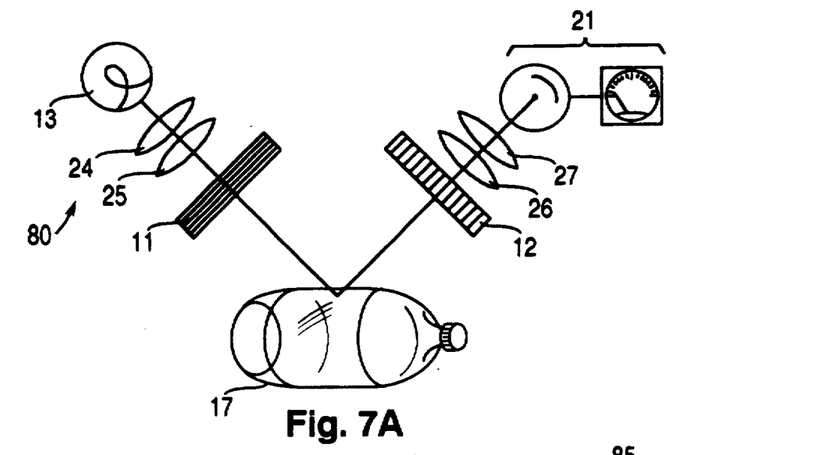
FIGS. 7A and 7B are schematic diagrams of two forms of apparatus according to the invention which operate by reflection rather than transmission of incident radiation.

FIG. 7A illustrates a further apparatus 80 of the invention wherein light source 13, optics 24, 25 and polarizer 11, and light meter 21, optics 26, 27 and analyzer 12 are positioned on the same side of container 17 to measure reflection of visible light off the surface of plastic container 17. In this embodiment, the difference in birefringence between the oriented PET in the container wall and a PVC container wall causes essentially the same difference in light intensity as described above for the embodiments of FIGS. 1-5. The beam splitting due to the different indices of refraction in different directions of the crystalline plastic occurs when the incident beam strikes the plastic surface. This embodiment of the invention does not require the plastic article to be transparent, and thus can be used on opaque materials as well.

Figure 7B:
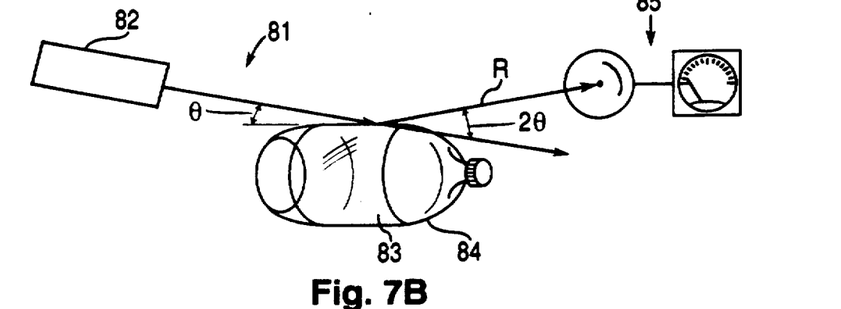

FIG. 7B illustrates another type of reflection-based apparatus 81 according to the invention which utilizes X-rays instead of visible light, and thereby dispenses with the need for polarizing filters and related optics. In this embodiment, an incident X-ray beam from an X-ray generator 82 (such as a sealed X-ray tube with a copper target at approximately 20-90 kV with a monochrometer or filter) strikes the paper label 83 of a labelled plastic container 84. The incident beam passes through label 83 with some degree of attenuation, and a portion of the beam reflects off the surface of the underlying wall of container 84. The amount of X-radiation diffracted (reflected) depends upon the crystallinity of the plastic. The highly ordered crystalline structure of oriented PET causes a relatively large amount of X-ray reflection. X-rays not reflected are transmitted through container 84 or absorbed in article 84. Angle of incidence ($\theta$) is generally $13°\pm4°$ for crystalline PET plastic articles using copper K$\alpha$ X-radiation. The diffracted beam is then measured by an X-ray detector 85, such as a Geiger counter.

Unlike the embodiment of FIG. 7A, apparatus 81 measures the difference in intensity between the amount of X-rays diffracted by Bragg reflection for PET and PVC articles. This is a direct function of crystallinity. In FIG. 7B, therefore, the diffracted X-ray beam varies in intensity depending on the crystallinity of the plastic surface. In FIG. 7A, the intensity of the reflected plane polarized optical beam just after it reflects off the plastic surface is substantially the same until the reflected beam reaches the polarizing filter 12, which reduces the intensity of a beam reflected off a PVC or similar non-birefringent surface.

Figure 7C:
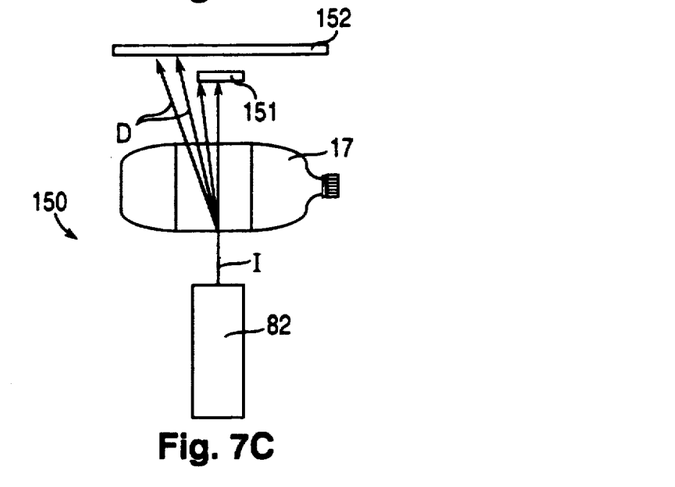
FIG. 7C is a schematic diagram illustrating an apparatus according to the invention for observing only the X-ray diffraction halo resulting from X-ray diffraction according to the invention.

FIG. 7C describes an X-ray diffraction apparatus 150 similar to the embodiment of FIG. 7B but of different geometry. The direct incident beam (I) from the X-ray generator 82 strikes the container 17, preferably at a 90° angle, passes through container 17 and is absorbed by a suitable beam stopper 151. A detector 152, such as X-ray sensitive film or Geiger counter, detects diffracted X-ray beams (D) which have been diffracted by 13 +/−4 degrees or more (for PET) using copper K$\alpha$ X-rays. The absorber 151 is configured to stop X-rays transmitted at 9° or less from the incident direction. A PET container will thus give rise to intense diffracted X-rays around beam stopper 151, whereas such diffracted X-rays will be absent for PVC and similar plastics of low crystallinity.

Figure 8:
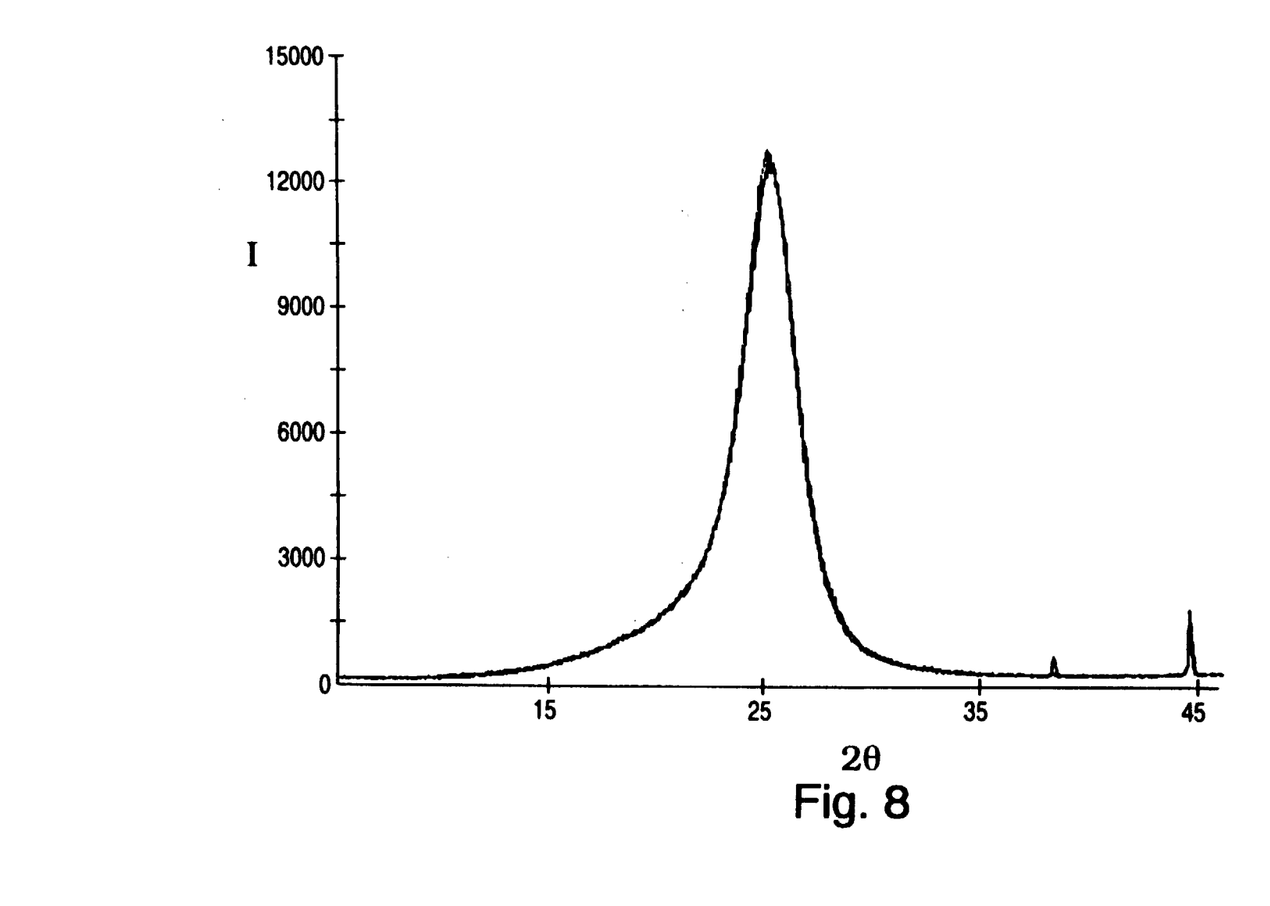
FIGS. 8 through 12 are graphs plotting the intensity of X-rays of wavelength 1.54 angstroms versus diffraction angle $2\theta$ for PET and PVC articles.

FIGS. 8 through 12 illustrate the results of a series of examples of the method of the invention using apparatus 81 of FIG. 7B. Each graph plots the intensity of the diffracted beam in counts per second versus $2\theta$, which is twice the angle of incidence ($\theta$). In FIG. 8, a pair of intensity curves were generated by varying $2\theta$ from 10 to 40 degrees. A large change in intensity occurred over the range $2\theta = 18$ to 34, which corresponds to an angle of incidence ($\theta$) of about 9° to 17°. In this range the PET article, which was a piece taken from the cylindrical side wall of a standard 2-liter PET beverage container, reflected a large amount of X-radiation, as much as 12,000 counts/second. The incident beam was directed at two different sites along the cylindrical container wall with essentially identical results. The container surface was free of labels and other obstructions.

Figure 9:
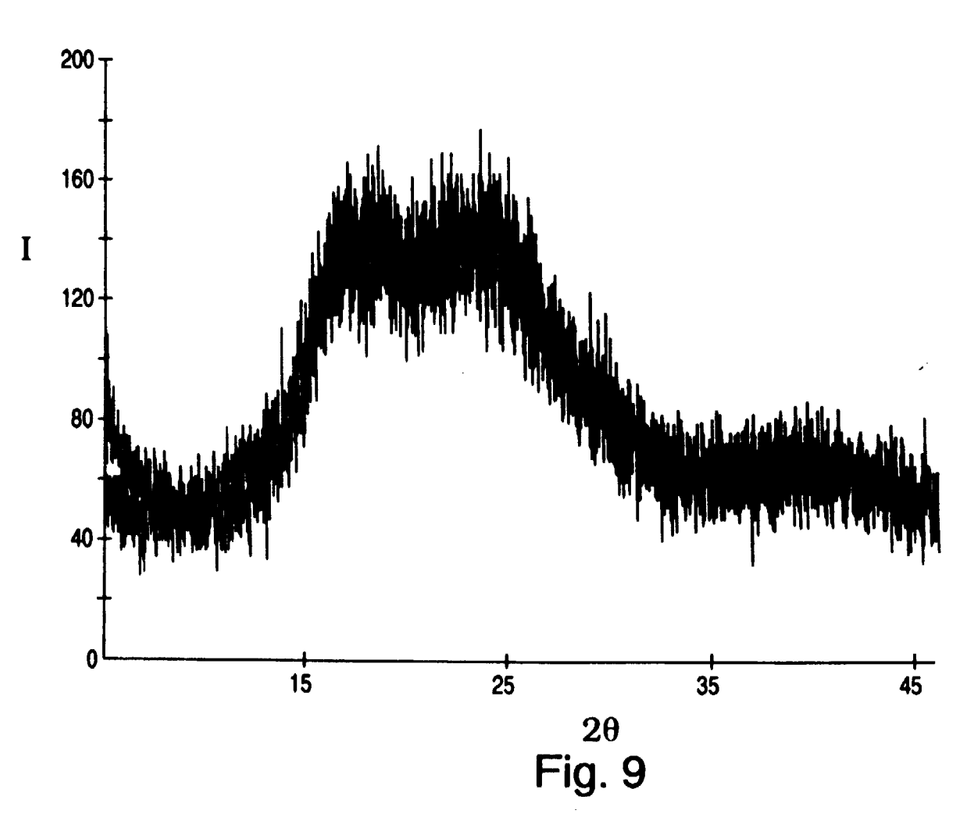

FIG. 9 illustrates the results obtained when the procedure described in connection with FIG. 8 was repeated for a PVC container having essentially identical geometry. As before, the scan was carried out twice at two wall locations, and both plots are superimposed on each other in FIG. 9. The intensity of reflected radiation remained within the range of 40-160 cnts/sec throughout the scan due to the non-crystalline nature of the PVC surface. The ratio of the intensities between the peaks for PET and PVC shown in FIGS. 8 and 9 at ($\theta$) = 13°, is about 100:1.

Figure 10:
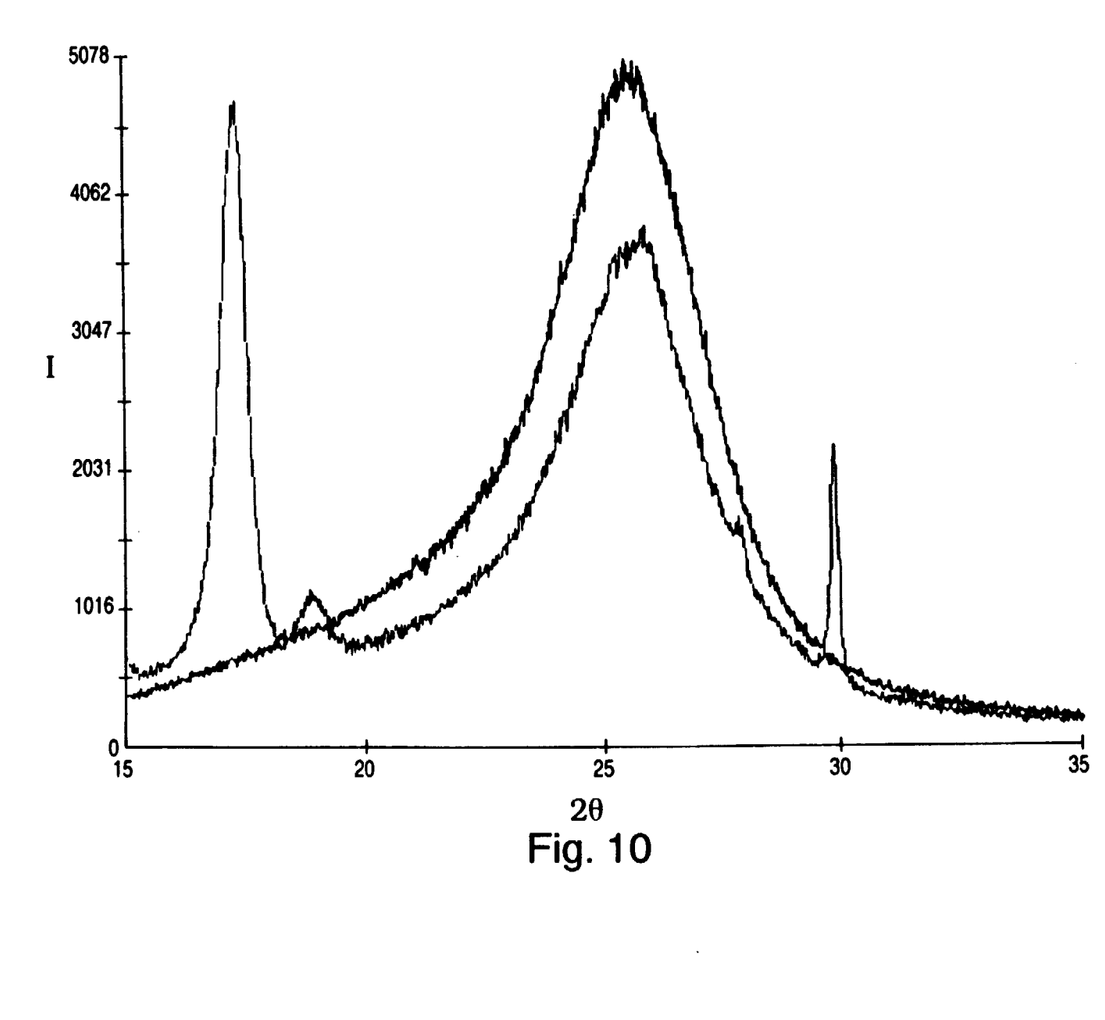

FIG. 10 illustrates the effect of a plastic label on the scan of a PET container. The curve which peaks at about 5,000 cps represents an unlabeled PET container, and the second curve having several peaks represents the same container surface covered by a plastic label made of oriented polypropylene about 0.04 mm thick. As the two curves illustrate, the plastic label caused characteristic peaks of its own outside of the range in which the PET peak is encountered, and attenuated the PET curve to about 4,000 cnts/sec, i.e., by about 20%. The resulting measured value of about 4,000 cnts/sec for the PET container was still much greater than the value for a PVC container (about 40:1). This example illustrates that the presence of a thin plastic label over a PET bottle surface does not prevent this embodiment of the invention from distinguishing a PET article from a PVC article.

Figure 11:
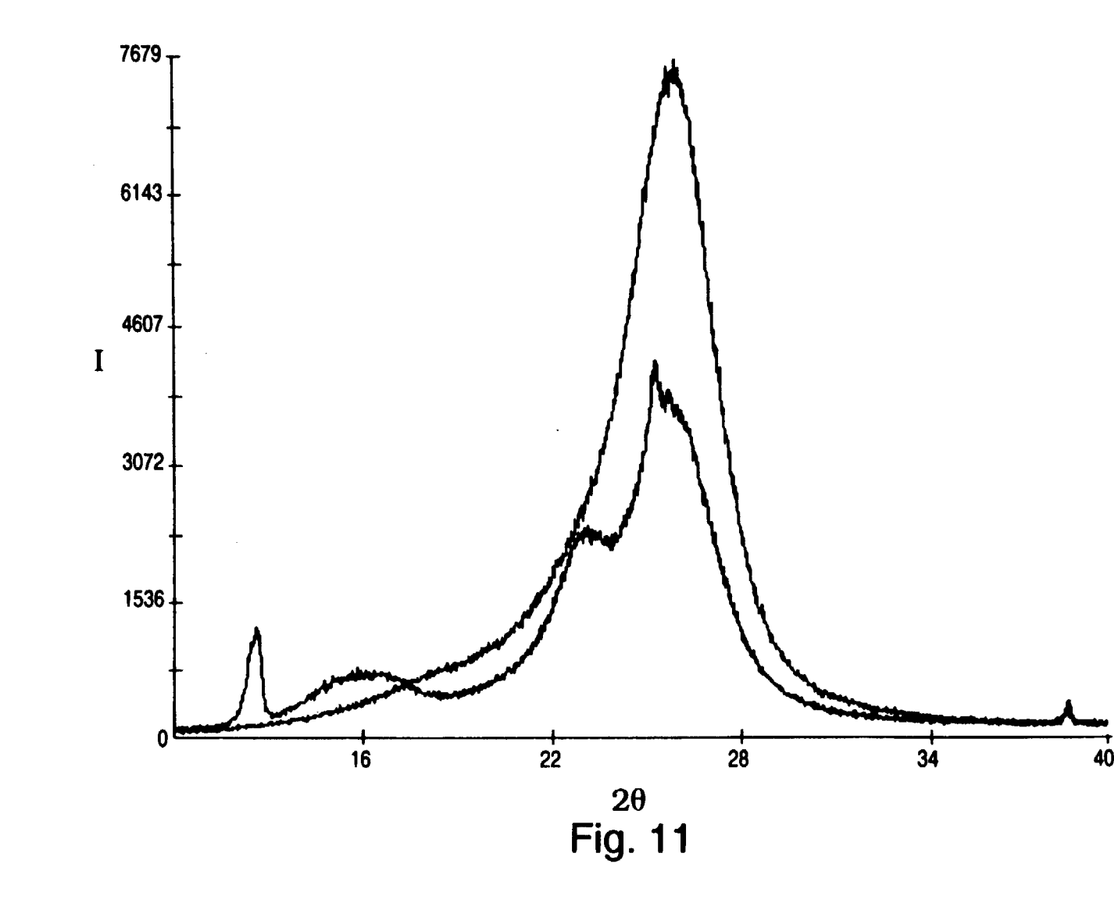

FIG. 11 refers to substantially the same experiment as FIG. 10, except that a different piece of PET plastic was used to generate a first curve peaking at about 7600 cnts/sec, and the comparative PET article was covered by a thin paper label instead of a plastic label. The paper label was of the type conventionally applied to the midsection of 2-liter PET and PVC beverage containers. As FIG. 11 shows, the paper label attenuated the PET peak at $2\theta = 26°$ to about 4000 cnts/sec. The resulting reduction of about 50% still permits reliable sorting of labelled PET and PVC containers.

Figure 12:
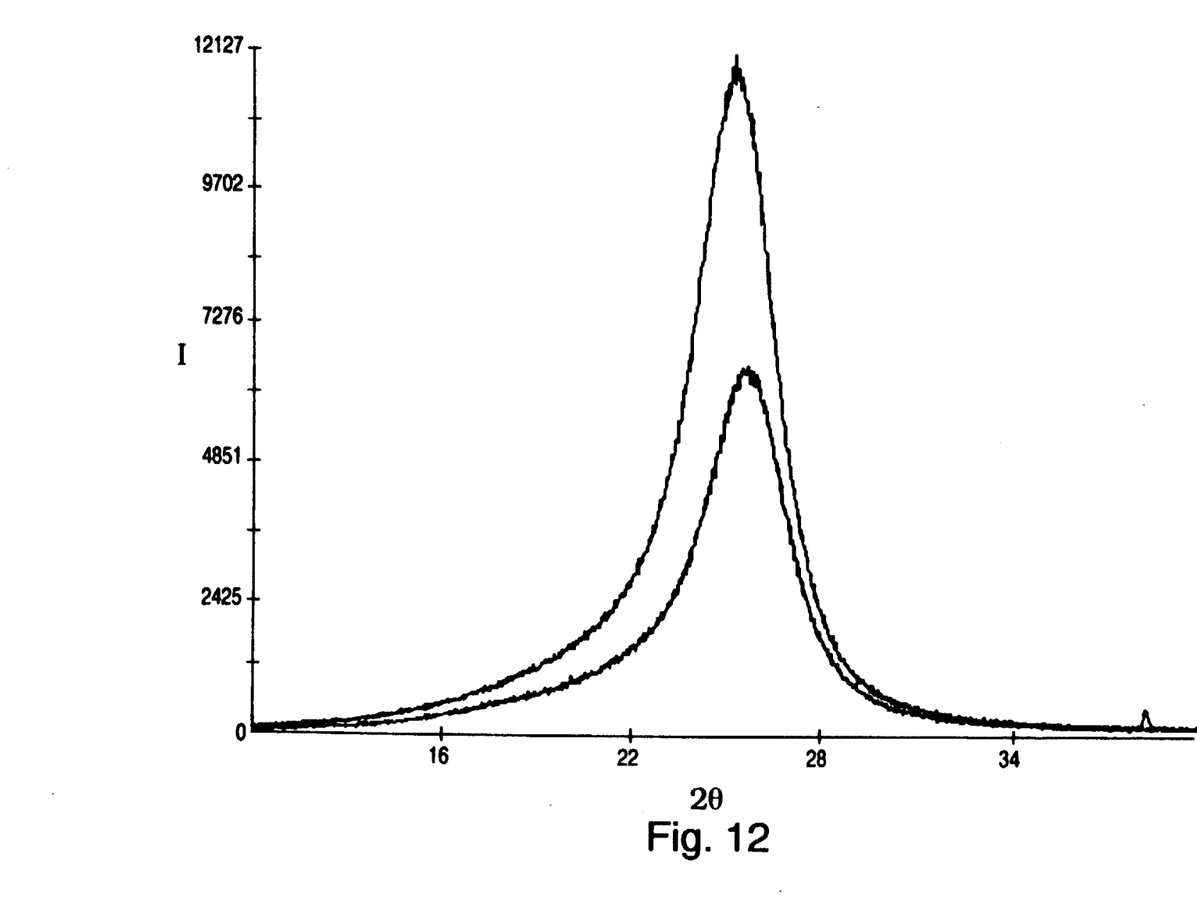

FIG. 12 illustrates the effect of damaging a PET container. The curve peaking at about 12,000 cnts/sec represents an undamaged PET container, whereas the second curve peaking near 6,000 cnts/sec represents the same container examined at the same location after having been damaged by bending at that location. The resulting intensity was again reduced by about 50%, but the signal intensity ratio (PET:PVC) is still very large.

Figure 13:
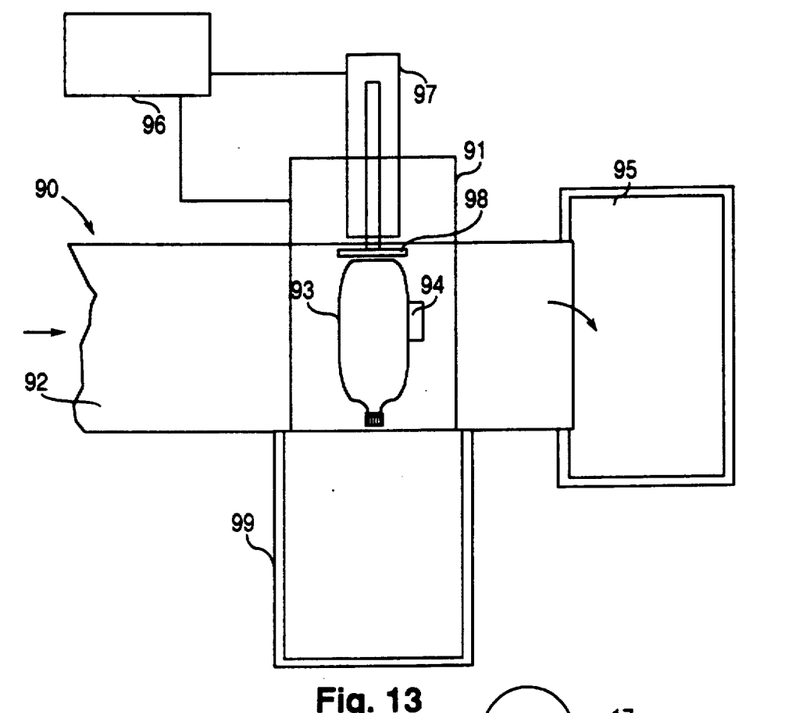
FIG. 13 is a schematic diagram of an automated sorting system according to the invention.

FIG. 13 describes a further automated sorting apparatus 90 including an overhead reflection scanning unit 91 according to the invention, such as illustrated in FIGS. 7A or 7B, positioned above a conveyor 92 on which PET and PVC bottles 93 are being transported, as shown. Conveyor 92 stops each time a bottle 93 trips limit switch 94. Scanning unit 91 registers an intense (light) signal if container 93 is PET, or a dark (zero) signal if PVC. A controller 96 actuates a solenoid ejection mechanism 97 if a light signal is generated, and the arm 98 thereof pushes bottle 93 off conveyor 92 and into a PET collection chute 99. If bottle 93 is PVC, it remains on conveyor 92 until it reaches the end, whereupon it falls into a PVC collection chute 95.

Figure 14:
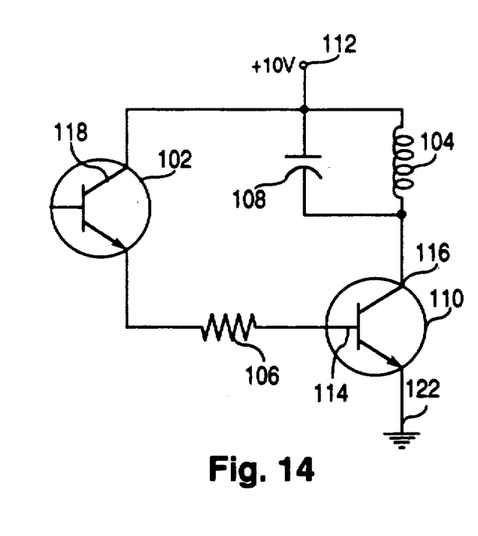
FIG. 14 is a schematic diagram of an exemplary control circuit according to the invention.

FIG. 14 illustrates a circuit which may be used as controller 96. The control circuit uses a phototransistor 102 to energize or deenergize a relay coil 104 of the solenoid ejector 97. The circuit includes a resistor 106, a capacitor 108, an npn transistor 110 and a low voltage power source 112, in addition to the phototransistor 102 and relay coil 104. Power source 112 is coupled to the base 114 of transistor 110, with phototransistor 102 and resistor 106 coupled in series between power source 112 and base 114. Power source 112 is also coupled to the collector 116 of transistor 110, with capacitor 108 and relay coil 104 coupled in parallel between power source 112 and collector 116.

Relay coil 104 is normally deenergized. When phototransistor 102 is exposed to light at a predetermined threshold intensity, phototransistor 102 switches on to raise the voltage between the base 114 and emitter 122 such that transistor 110 is switched on, energizing relay coil 104 and actuating solenoid 97. Capacitor 108 protects transistor 110 from current surges caused by the inductive characteristics of relay coil 104. When phototransistor 102 is not exposed to light, relay coil 104 becomes deenergized because phototransistor 102 is switched off, dropping the voltage between base 114 and emitter 122 such that transistor 110 is also switched off. Thus, once the PET bottle 93 has been ejected, arm 95 returns to its original position by means of a return spring (not shown) or other suitable means.

Figure 15:
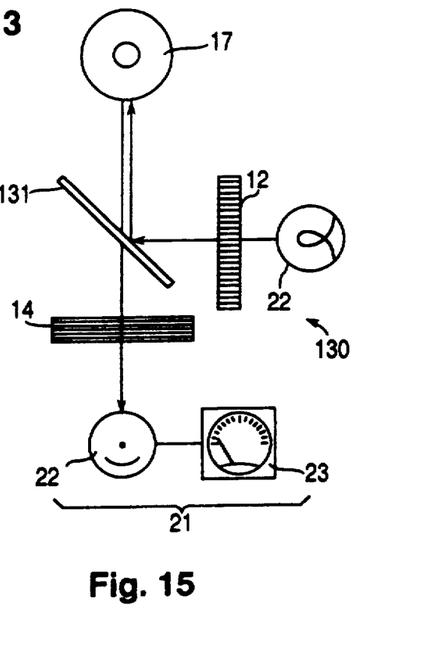
FIG. 15 is a schematic diagram of an optical back reflection apparatus according to the invention.

FIG. 15 illustrates a further embodiment of the invention which operates by back-reflection. In this embodiment, the scanning apparatus 130 includes the light source 22 and polarizer 12 oriented as in preceeding embodiments. Light passes through polarizer 12 and strikes a beam splitting mirror 131 oriented in the manner of a conventional metallograph. Mirror 131 is positioned so that light reflected towards container (sample) 17 is incident at about 90°. A portion of the light reflected back passes through mirror 131, analyzer 14 and reaches detector 22. This embodiment is advantageous in that it examines the article from one side only, rendering handling less difficult, eliminating thickness attenuation, and permitting the examination of thick or opaque materials.

Figure 16:
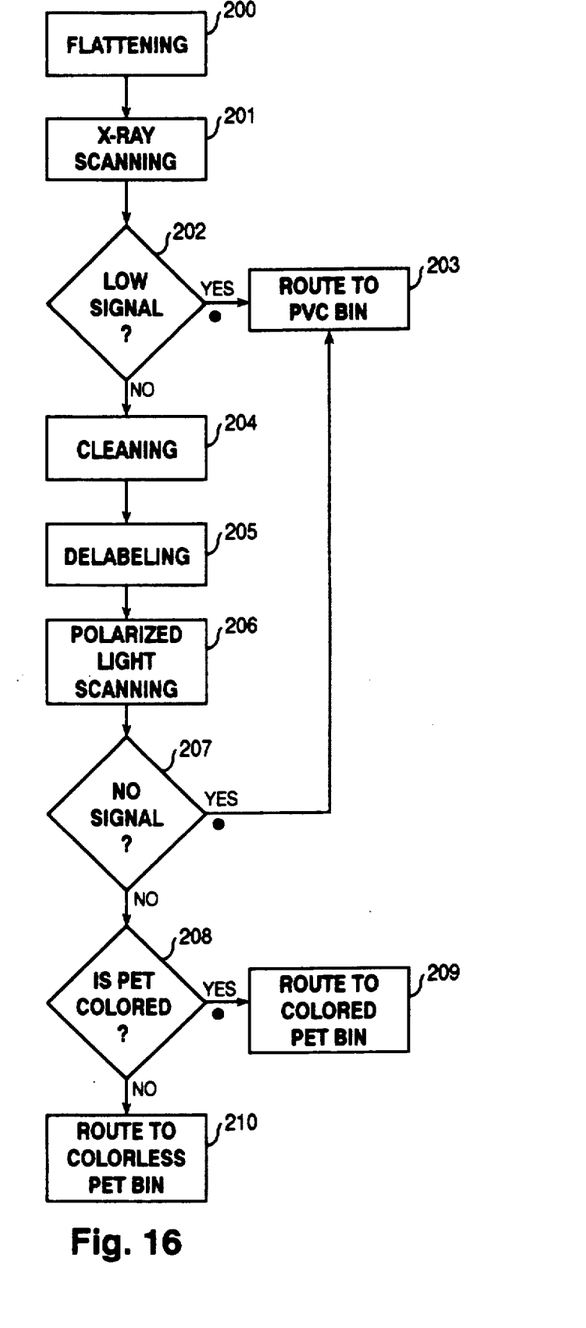
FIG. 16 is a flow chart of a two-stage automated sorting process according to the invention wherein a black dot indicates a yes answer to a decision.

Referring to FIG. 16, the foregoing different embodiments of the invention could be used in combination to provide a more complex automated sorting process. For example, such a process could comprise an initial X-ray scanning step 201, if necessary preceded by a step 200 of flattening the container, e.g., by feeding it through a nip between a pair of rollers. In a decision 202, the plastic container is sent to a PVC (or low crystallinity) bin (step 203) if the magnitude of the relected X-ray signal is low. If the magnitude is high, indicating PET, the container is subjected to successive steps of cleaning and delabelling (204, 205), and then scanned a second time using one of the preceding polarized light embodiments (step 206). If there is no signal (decision 207) the container is again routed to the PVC bin (step 203). If the signal is low, i.e., below a predetermined threshold which indicates a container of colored PET (decision 208), the container is routed to a bin for colored PET (step 209). Otherwise, it is routed to a bin for clear colorless PET (step 210). This process has the advantages of doublesorting to ensure against PVC contamination and subsorting of PET containers into clear and colorless groups, a breakdown which is advantageous in recycling.

In the foregoing embodiments of the invention using a light source, white polychromatic light is typically used for illumination. Bottles or other clear polymeric articles are introduced individually between the two polarizing filters. Whole bottles are then examined, preferably after labels or other optically opaque materials are removed.

Many variations of the foregoing methods and systems are possible. For example, circuitry to control the routing of the inspected object can be devised to activate, based on either bright image (PET) or dark field (PVC). Since PVC is expected to be the less prevalent material among containers currently in use, activation of a diverter on the basis of high light attenuation (dark field) should prove faster and longer lived in practice. The diverter could consist of an electronically-activated gate that segregates the PVC material to a side stream or collection bin. Diversion may occur at the inspection point, or at a convenient location downline from the inspection point.

Observations of whole objects are preferably performed after removal of opaque labels or other obstructions. However, using a restricted viewing zone, suitable transparent object areas may be observed with labels/obstructions in place. Sorting of flake or chip materials may be accomplished with a suitably sized observation window. It is necessary to present individual chips or a monolayer of chips to the scanning device for identification because a PVC chip superimposed over a PET chip will appear transparent.

Orientation of the PET material with respect to the polarizing filters produces variations in attenuation. To maximize detector response, a mechanical arrangement which locks the two polarizers at total extinction is preferred. This comprises, for example, a pair of parallel axes on which filter is rotatably mounted and a linkage for synchronous rotation of each axle. Such a device allows parallel rotation of the paired crossed polarizers through a wide arc with respect to an object under observation. A PVC bottle will not produce a significant change in transmitted light, whereas a PET bottle will transmit intense light at most points in the arc.

A manual apparatus of the type shown in FIG. 1 was tested as follows. The apparatus consisted of two polarizing films set at maximum attenuation, i.e., at a 90° angle. An open-sided box was used to support the upper filter. The assembly was set on the light source (an overhead projector) to observe intensity changes in transmitted light. Initial experiments with one PVC vegetable oil bottle and one PET 2-liter beverage bottle produced significantly different degrees of transmission between polarizing filters at maximum extinction. Four 1 liter PET beverage containers were subsequently examined after 30 sec (maximum) exposure to water heated to 60°, 75°, 90°, and 100° C., respectively, to produce relaxation of the container. All four containers produced high transmission through the maximum attenuation polarizers.

A synthetic mixture of PET and PVC chips was examined between polarizing filters at maximum attenuation. PET chips produced high transmission, but PVC chips did not allow sufficient transmission to be observed at maximum attenuation. It was confirmed that a PVC chip overlapping with a PET chip will appear to transmit, but when individual chips are examined in a monolayer, a PVC chip fails to transmit.

A series of six household product bottles of clear colorless plastic having straight molding seams (consistent with molded PVC products) were also examined using polarizing filters at maximum attenuation. Five of the six produced no appreciable transmission of light and were subsequently identified as PVC by infrared spectroscopy. The sixth material was subsequently identified as polystyrene by infrared spectroscopy.

Under a red helium-neon laser, PET exhibited the same depolarizing effect observed with polychromatic light. PVC did not exhibit observable transmission of the source radiation. When observing a clear green PET bottle, a reduction of source intensity was noted compared to that observed with clear colorless PET. Using the proper monochromatic source, a detector set with two thresholds could sort PET from PVC and colored PET from colorless PET by this means.

A variety of methods for detecting polarized light may be employed. The simplest method is visual observation of image intensity, e.g., as in FIG. 1 above. This allows an inexpensive screening device to be used at reclamation centers, e.g., community plastic drives, to provide an initial sorting.

In the alternative, a relatively simple circuit incorporating a photographic light meter could be used. This approach allows simple color sorting in addition to plastic separation on the basis of image intensities. A digital system could employ a digital voltmeter circuit in place of the analog meter. The analog output of the light meter circuit could be directed to an analog-to-digital convertor for use in digital circuitry/data processing. This could be particularly useful in simultaneous color identification, or for multi-point examination of the bottle along its length to avoid false PVC identifications due to the presence of opaque materials on the bottle.

As to wavelength ranges useful in the method of the invention, a large portion of the electromagnetic spectrum is applicable. Any wavelength that is affected by the crystallinity/orientation of the plastic produce a useful response from far infrared to X-rays, i.e., from 0.1 angstrom to .500 $\mu$m.

Various factors should be accounted for in carrying out the method of the invention. Positive responses from other depolarizing polymers such as polystyrene or polycarbonate may require prior separation on the basis of density or physical size/shape of the object to remove these materials. Reflected or scattered radiation might produce a depolarization effect that could be erroneously interpreted as a positive PET response. This should be minimized by using a relatively small illumination diameter. Stray light that enters the detector during examination could also produce a positive signal. This can be minimized with appropriate light screens at the entrance and exit of the detector, as shown above.

Container geometry is important to examination of the container. PET bottles of conventional 2-liter design are best examined in any part of the stretch area (sidewall). Although small chips of the threaded finish area are depolarizing, the material appears to be excessively thick to allow effective visual observation. The containers should be presented to the examination device individually, since an overlap of a PVC container with a PET container will produce a false positive. For both polarized light and X-ray diffraction in bulk reprocessing environments, a step of flattening the containers prior to scanning could be used to present a reasonably uniform sample to the examination device, minimizing spurious scattering and assuring effective observation geometry. Optical examination wherein light passes through the container requires a transparent path through the bottle. Generally, a region between the finish and the label is available in bottles presently in commercial use.

Heating of PET can induce complete relaxation of the PET structure. Since the long range ordering of the material is fundamental to the X-ray and polarized light scanning methods, complete loss of ordering would hamper these techniques. In practice, however, plastic containers to be recycled are rarely subjected to such conditions.

Crystallinity in polymers involves ordering of polymer molecules in a manner analogous to crystals. Spherulites may also be present in the polymer bulk. Ultimately, any method of measuring the crystallinity of PET can be used to separate PET from PVC. These and other modifications may be made without departing from the scope of the invention as expressed in the appended claims.

I claim:

1. A method for sorting a mixed group of plastic containers, which group contains at least two types of containers made of polyethylene terephthalate and polyvinyl chloride having a crystallinity indicative of each type of plastic, comprising the steps of:
    subjecting each one of the plastic containers in the group to a beam of electromagnetic radiation having a frequency such that transmission, reflection and diffraction of the radiation are substantially affected by the crystallinity of the plastic;
    then detecting the intensity of the affected portion of the beam, which intensity varies in a manner indicative of the crystallinity of the plastic from which the container is made; and
    then sending each container to one of a plurality of destinations according to the crystallinity of each container.

2. The method of claim 1, wherein the beam of electromagnetic radiation comprises an X-ray beam.

3. The method of claim 2, wherein the affected portion of the beam comprises diffracted X-rays.

4. The method of claim 2, wherein the affected portion of the beam comprises reflected X-rays.

5. The method of claim 1, wherein the detecting step utilizes only a single beam to determine the crystallinity of the plastic.

6. A method for sorting a mixed group of plastic containers, which group contains at least two types of containers made of polyethylene terephthalate and polyvinyl chloride having a birefringency indicative of each type of plastic, comprising the steps of:
    transporting each one of the plastic containers between a pair of spaced, opposed first and second light polarizing filters oriented for extinction of light passing therethrough;
    illuminating each of the containers with a beam of light directed to pass successively through the first filter, the container, and the second filter;
    detecting the intensity of the beam on the side of the second filter opposite the container, which intensity varies in a manner indicative of the birefringency of the plastic from which the container is made; and
    sending each container to one of a plurality of destinations according to the type of plastic each container is made of.

7. The method of claim 6, wherein said light beam comprises a laser beam.

8. A method for sorting transparent plastic articles of varying birefringence, comprising:
    transporting a series of the plastic articles on a conveyer which transports said series of articles simultaneously for successive presentation to a scanning unit positioned proximate the conveyer, wherein said conveyer comprises a moving surface on which the articles are simultaneously transported in spaced positions free of guides for causing each articles to be presented to the scanning unit in substantially the same orientation, the scanning unit including a light source, a detector for indicating the intensity of light from the light source, a polarizer and an analyzer, the polarizer and analyzer being disposed for extinction of light from the light source traveling along a pathway from the light source to the detector, each article being interposed in the light pathway following the polarizer and before the analyzer while remaining on the conveyer system;
    detecting the intensity of light from the light source at the detector; and
    routing each plastic article from the conveyer to one of a plurality of destinations based on the intensity registered by the detector, which intensity is indicative of the birefringence of the plastic from which the plastic article is made.

9. The method of claim 8, wherein the plastic articles comprise a mixture of polyethylene terephthalate articles and polyvinyl chloride articles.

10. The method of claim 9, wherein the articles are beverage containers.

11. The method of claim 10, further comprising a step of delabeling each container prior to feeding to the scanning unit.

12. The method of claim 8, wherein the method further comprises:
    transporting the articles on said conveyer one at a time to the scanning unit;
    diverting a group of articles of like birefringency from the conveyer; and
    continuing to transport the remainder of the articles on the conveyer to a different destination than the diverted group.

13. The method of claim 8, wherein the light source produces visible light and the detector measures the intensity of such visible light.

14. The method of claim 8, wherein the plastic article is interposed between the polarizer and analyzer so that the light from the light source passes through the plastic article.

15. The method of claim 8, wherein the polarizer and analyzer, light source and detector are positioned on the same side of the plastic article so that the light from the light source reflects off of the surface of the plastic article.

16. The method of claim 8, wherein the plastic article is interposed between the polarizer and analyzer so that the light from the light source passes through the plastic article.

17. The method of claim 8, wherein light from the light source illuminates the each whole article substantially uniformly.

18. The method of claim 17, further comprising the step of collimating light from the light source in order to illuminate each whole article substantially uniformly.

19. A method for sorting a mixed group of plastic containers, which group contains at least two types of containers having a crystallinity indicative of each type of plastic, comprising the steps of:
(A) flattening each of the plastic containers;
(B) then subjecting the flattened plastic containers to a beam of electromagnetic radiation having a frequency such that transmission, reflection and diffraction of the radiation are substantially affected by the crystallinity of the plastic;
(C) then detecting the intensity of the affected portion of the beam, which intensity varies in a manner indicative of the crystallinity of the plastic from which the container is made; and
(D) then sending each container to one of a plurality of destinations according to the crystallinity of each container.

20. The method of claim 19, wherein step (A) further comprises delabelling the containers.

21. The method of claim 19, wherein the containers are made of polyethylene terephthalate and polyvinyl chloride, and steps (B)-(D) further comprise:
transporting each one of the plastic containers between a pair of spaced, opposed first and second light polarizing filters oriented for extinction of light passing therethrough;
illuminating each of the containers with a beam of light directed to pass successively through the first filter, the container, and the second filter;
detecting the intensity of the beam on the side of the second filter opposite the container, which intensity varies in a manner indicative of the birefringency of the plastic from which the container is made; and
sending each container to one of a plurality of destinations according to the type of plastic each container is made of.

22. An apparatus for sorting transparent plastic articles of varying birefringence, comprising:
a substantially opaque housing have a first, centrally located opening along its length and a second opening at one end thereof;
a light source disposed within the housing at the end remote from the second opening;
a polarizer disposed within the housing between the light source and the first opening; and
an analyzer disposed in the housing on the side of the first opening opposite the polarizer and spaced from the polarizer to permit manual insertion of each transparent plastic article between the polarizer and analyzer through the first opening and viewing of the transparent article through the second opening.

23. The apparatus of claim 22, wherein said analyzer is disposed in said second opening.

24. The apparatus of claim 22, further comprising a cover for said first opening.

* * * * *